Patented Mar. 26, 1940

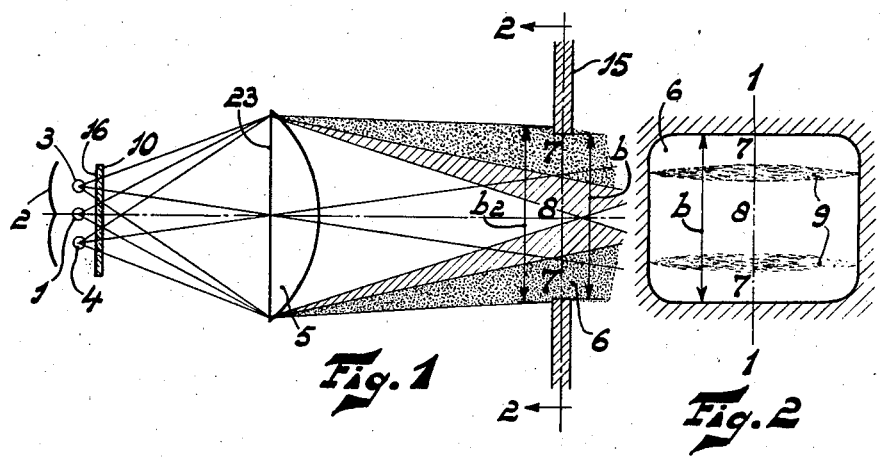
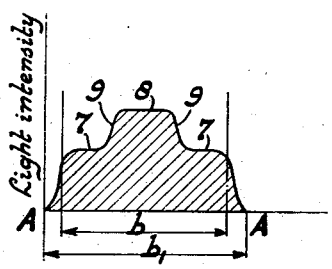
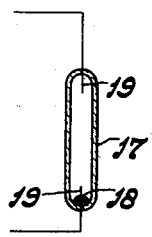
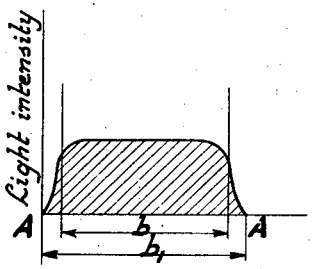
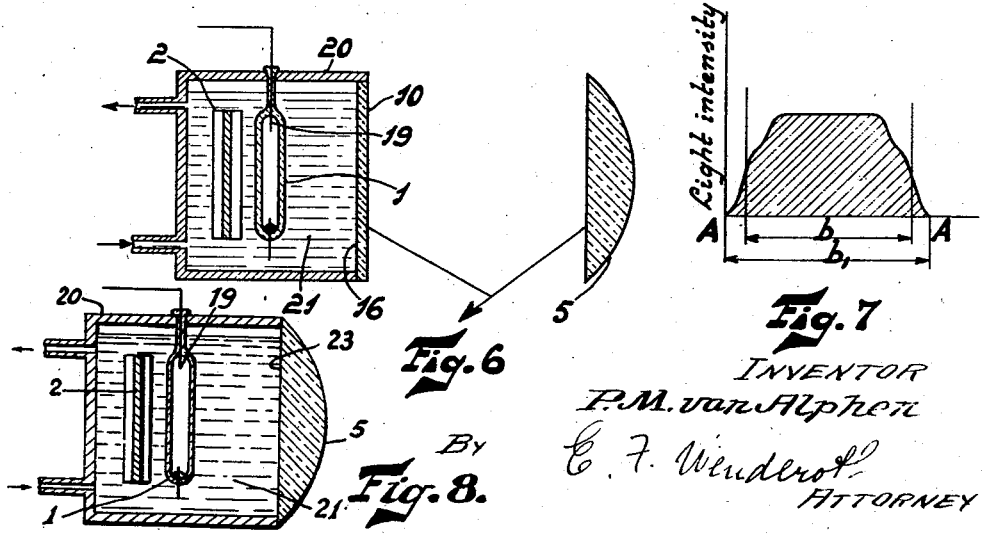
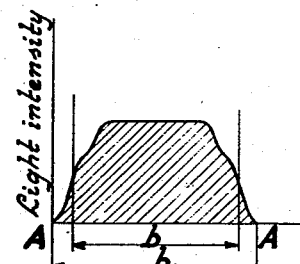

2,195,392

UNITED STATES PATENT OFFICE 2,195,392

PROJECTION APPARATUS

Pieter Martinus van Alphen, Eindhoven, Netherlands, assignor to N. V. Philips' Gloeilampenfabrieken, Eindhoven, Netherlands Application May 20, 1937, Serial No. 143,835
In Germany May 20, 1936

3 Claims. (Cl. 88—24)

My invention relates to projection apparatus comprising a condenser lens having chromatic aberration, and at least one high-pressure metal-vapor discharge tube serving as a light source.

I shall describe my invention in connection with picture projection apparatus, however, it is not limited thereto but is equally applicable to other types of projection apparatus in which a homogeneous beam of light is desired, such as searchlights.

Such tubes are very suitable for use in projection apparatus because they emit a very intense light of suitable spectral properties; however in some cases difficulties arise due to the linear shape of the discharge path, for example, it is difficult to obtain uniform illumination of the rectangular film gate in a film projector. It has been proposed to overcome this difficulty, for example by arranging a reflector behind the discharge path to produce two or more supplementary images of the discharge path and thus insure that the condenser lens is illuminated by a more or less plane-shaped light source, or by using a plurality of juxtaposed discharge paths.

I have found that when such tubes are used in the above manner further difficulties arise because after having passed through the chromatically-uncorrected condenser lens, the light beams exhibit at their edges, blue bands which cause dark spots or stripes upon a plane surface arranged perpendicular to the axis of the beam. This is especially disadvantageous in film projection because the dark stripes mark the picture produced on the projection screen.

The object of my invention is to eliminate the above disadvantages, and to obtain in such projection systems a "homogeneous" beam of light.

In accordance with the invention, I arrange at least in the path of the directly-emitted luminous rays, a light-transmitting body, preferably a glass body, provided with at least a light-diffusing surface which is in contact with a light-transmitting substance of greater optical density than air.

Under a light-transmitting substance of greater optical density than air is here to be understood a substance of which the index of refraction between said substance and the air is greater than one.

By "homogeneous" as used herein is meant not only that the luminous intensity of the beam is substantially constant throughout the cross section thereof, but also that the color distribution of the light is the same, or at least is such that the above-mentioned inconveniences of refraction are reduced to an extent that they produce no troublesome results during projection.

I am aware that it is known to arrange in a light beam to obtain a uniform diffusion of the rays, a light-diffusing transparent glass body, such as an opalescent glass bulb, or a transparent body having a light-diffusing surface, for instance a frosted bulb of an incandescent lamp. It has also been proposed to provide a disc of frosted glass in the light path of projecting apparatus. However, it should be noted that the use of such a glass disc results in a condsiderable loss of light because the angle of diffusion is about 180°, and consequently a large quantity of the luminous rays fall outside the edge of the condenser lens and can not be utilised thereby.

The invention, however, overcomes this drawback by intercepting the luminous rays proceeding from the light-diffusing surface or body in a light-transmitting substance which has greater optical density than air, as mentioned above. With a proper choice of the light-transmitting substance the above-mentioned angle of diffusion can be reduced in this way from 180°, for example, to 60°, and light losses due to the diffusion can be practically eliminated.

It is also advisable to give the substance in contact with the light-diffusing body, an optical density which only slightly differs from that of said body, whereby the losses due to diffusion are reduced to a minimum. For this purpose, when using a liquid-cooled discharge tube it is advantageous to use the cooling liquid, for instance water or oil, for this purpose.

The light-diffusing body according to the invention, may be of various forms, for example it is possible to frost the condenser lens already present, at least on one side, or to make this lens light-diffusing in any other manner. As in this case the diffused light is laterally deflected and consequently cannot be utilised for the intended purpose, I prefer in those cases in which a very high luminous output is desired, to arrange between the discharge tube and the condenser lens, a glass disc which itself is made light-diffusing in the manner above indicated. As the radiated light beams are highly concentrated at the point at which this glass disc is located, the luminous rays which are laterally deflected by the disc still reach the condenser lens because they are reflected by the casing containing the light source and the condenser lens. Thus in such a construction there will be substantially no light losses.

In order that my invention may be clearly understood and readily carried into effect, I shall describe same in more detail with reference to the accompanying drawing, in which:

Figure 1 is a diagrammatic view of a film projection apparatus according to the invention;

Fig. 2 is a section along line 2—2 of Fig. 1 without using the invention.

Fig. 3 is a curve showing the light intensity at the picture gate without using the invention.

Fig. 4 is a sectionized view of the discharge tube of Fig. 1;

Fig. 5 is a curve showing the light intensity at the picture gate of Fig. 1 without using the invention.

Fig. 6 is a diagrammatic view of part of the apparatus of Fig. 1 and illustrates an embodiment of the present invention; and Fig. 7 is a light-intensity curve for the system shown in Fig. 6, and Fig. 8 is a sectionized view of a portion of a projecting system embodying the invention.

The picture projection system diagrammatically shown in Figs. 1 and 2 comprises a light-source 1, cooperating with a suitable reflector 2 to produce two images 3 and 4, a chromatically-uncorrected condenser lens 5, and a picture gate 15 having a picture aperture 6. Between the light-source 1 and lens 5 is a glass disc having a frosted surface 16. Instead of using only one discharge tube and a reflector of the type shown, a plurality of juxtaposed tubes may be used.

Light source 1 is a high-pressure mercury-vapor discharge tube such as shown in Fig. 4. The tube shown in Fig. 4 comprises a hermetically-sealed envelope 17 of light-transmitting material, such as quartz, and two incandescible electrodes 18 and 19 across which a high potential is applied during operation of the tube. The tube has a gaseous filling and during operation a mercury vapor pressure higher than 6 atmospheres, for example 150 atmospheres, and for this purpose a supply of mercury or amalgam 19, is disposed in the tube. With such tubes it is possible to obtain an intrinsic brilliance of more than 20,000 international candles per square centimeter and even as much as from 100,000 to 150,000. In addition the spectral properties of the emitted light is very satisfactory for projection purposes.

Referring now to Figures 1 and 2 in which the light beams emitted from light source 1 and from images 3 and 4 are indicated by their center lines. Assuming that disc 10 is not present, lens 5 will concentrate the light emitted by source 1 and images 3 and 4 so that the central zone 8 of film gate 15 (see Fig. 2) will be illuminated substantially by two beams of light, whereas the end zones 7 will be illuminated by only one beam of light, and dark spots or zones 9 will occur. Thus the illumination of the picture aperture 6 and of the projection screen will be very unsatisfactory.

The dark spots or zones 9 are particularly troublesome at those points at which a plurality of light beams overlap, due probably to refraction of the short-wave (blue) spectrum bands by the chromatically-uncorrected lens 5.

For the above case, the distribution of the light along lines 1—1 of Fig. 2 is illustrated in Fig. 3 in which the abscissa axis represents distance along line A—A and the ordinates represent relative light intensities. In this figure $b_1$ represents the width of the beam at the picture gate and $b$ represents the width of the picture aperture 6. As appears from the curve of Figure 3, portion 8, which corresponds to zone 8 in which both beams overlap each other, has a relatively high intensity, whereas portions 7 corresponding to zones 7, which result from a single beam, have a lower intensity. The intermediate portions 9 indicate the dark strips 9 of Figure 2 which produce undesired results in projection. From the above it appears that when using a clear, i. e. non-diffusing condenser lens in conjunction with such discharge tubes, difficulties arise due to the dark strip 9, and also to the very abrupt changes in light intensity.

If now the frosted disc 10 is arranged in the path of emitted light, the conditions at the picture gate will be materially improved as indicated in Fig. 5 which has the same coordinates as Fig. 3. From Fig. 5 it appears that the homogeneity of the light in the plane of aperture 6 is materially better; however the intensity is considerably decreased due to losses of light diffused by disc 10. Similar results are obtained by frosting, for instance, surface 23 of lens 5.

Considerably improved results are obtained according to the invention if glass disc 10 is arranged between the lens 5, and the images 3 and 4 and tube 1, and is in contact, at least on its frosted side, with a substance having a smaller optical density than that of the glass disc itself. This is illustrated in Fig. 6, in which the light source 1 and reflector 2 are enclosed within a housing 20 containing a circulating cooling liquid 21, such as water, whereas disc 10 forms part of the wall of the housing and has its surface 16 in contact with the cooling liquid. In this construction a greater part of the light is intercepted and utilised by the condenser lens, as appears from Fig. 7. In Fig. 7, which has the same coordinates as Figs. 3 and 5, the intensity is constant over the greater portion of the picture aperture, whereas the intensity is considerably greater than in Fig. 5.

Furthermore, the abrupt variations in intensity present in Fig. 3 are not present and a very homogeneous illumination of the picture aperture is obtained.

As shown in Fig. 8, which is similar to Fig. 6 and has the same parts indicated by similar reference numerals, the condenser lens 5 provided with a regular diffusing surface 23 forms part of the housing for the light source 1. In this case the diffusing surface 23 is in contact with the cooling liquid 21 and produces the same results as obtained in Fig. 6.

While I have described my invention in connection with specific examples and applications, I do not wish to be limited thereto but desire the appended claims to be construed as broadly as permissible in view of the prior art.

What I claim is:

1. A projection system for producing a homogeneous beam of light, comprising means for producing a plurality of light sources arranged parallel to each other in a plane perpendicular to the optical axis of the system, said means including a discharge tube having a linear contracted discharge path and a gaseous filling comprising mercury vapor at a pressure between 6 atmospheres and 200 atmospheres during operation, means for artificially cooling said discharge tube and including a housing surrounding the light sources and containing a cooling liquid, means intercepting a portion of the light emitted by said light sources to transform the same into a beam and including a condenser lens having chromatic aberration, and light-transmitting means intercepting the light passing to the condenser lens to homogenize the light beam, said latter means including a member forming part of the housing and having a light-diffusing surface in contact with said liquid.

2. A projection system for producing a homogeneous beam of light, comprising means for producing a plurality of light sources arranged parallel to each other in a plane perpendicular to the optical axis of the system, said means including a mirror and a discharge tube having a linear contracted discharge path and a gaseous filling comprising mercury vapor at a pressure between 6 atmospheres and 200 atmospheres during operation, means for artificially cooling said discharge tube and including a housing surrounding the light sources and containing a cooling liquid, said mirror being within said housing so as to be in contact with said cooling liquid, means intercepting a portion of the light emitted by said light sources to transform the same into a beam and including a condenser lens having chromatic aberration, and light-transmitting means intercepting the light passing to the condenser lens to homogenize the light beam, said latter means including a member forming part of the housing and having a light-diffusing surface in contact with said liquid.

3. A projection system for producing a homogeneous beam of light, comprising means for producing a plurality of light sources arranged parallel to each other in a plane perpendicular to the optical axis of the system, said means including a discharge tube having a linear contracted discharge path and a gaseous filling comprising mercury vapor at a pressure between 6 atmospheres and 200 atmospheres during operation, means for artificially cooling said discharge tube and including a housing surrounding the light sources and containing a cooling liquid, means intercepting a portion of the light emitted by said light sources to transform the same into a beam and including a condenser lens forming part of the housing and having chromatic aberration, and light-transmitting means intercepting the light passing to the condenser lens to homogenize the light beam, said latter means including a light-diffusing surface of the lens in contact with said liquid.

PIETER MARTINUS VAN ALPHEN.